US011030627B2

(12) United States Patent
Giera et al.

(10) Patent No.: US 11,030,627 B2
(45) Date of Patent: Jun. 8, 2021

(54) TECHNIQUES FOR SECURE MOBILE PAYMENT

(71) Applicant: NCR Corporation, Atlanta, GA (US)

(72) Inventors: Steven Jarrett Giera, Dacula, GA (US); Joel Aaron Miller, Atlanta, GA (US)

(73) Assignee: NCR Corporation, Atlanta, GA (US)

(*) Notice: Subject to any disclaimer, the term of this patent is extended or adjusted under 35 U.S.C. 154(b) by 349 days.

(21) Appl. No.: 15/895,574

(22) Filed: Feb. 13, 2018

(65) Prior Publication Data
US 2018/0189787 A1 Jul. 5, 2018

Related U.S. Application Data

(62) Division of application No. 13/955,872, filed on Jul. 31, 2013, now Pat. No. 9,947,013.

(51) Int. Cl.
G06Q 20/40 (2012.01)
G06Q 20/08 (2012.01)
G06Q 20/20 (2012.01)
G06Q 20/32 (2012.01)

(52) U.S. Cl.
CPC ....... *G06Q 20/409* (2013.01); *G06Q 20/0855* (2013.01); *G06Q 20/204* (2013.01); *G06Q 20/206* (2013.01); *G06Q 20/3226* (2013.01); *G06Q 20/3263* (2020.05)

(58) Field of Classification Search
None
See application file for complete search history.

(56) References Cited

U.S. PATENT DOCUMENTS

| 8,682,802 | B1* | 3/2014 | Kannanari | G06Q 20/367 |
| | | | | 705/65 |
| 10,037,526 | B2* | 7/2018 | Campos | G06Q 20/3674 |
| 2013/0159188 | A1* | 6/2013 | Andon | G06Q 20/4014 |
| | | | | 705/44 |
| 2017/0249639 | A9* | 8/2017 | Kranzley | G06Q 20/40 |

* cited by examiner

*Primary Examiner* — Allen C Chein
(74) *Attorney, Agent, or Firm* — Schwegman, Lundberg & Woessner

(57) ABSTRACT

Techniques for secure mobile payment are provided. A credit or gift card is registered for additional security, such that a secure identifier or personal identification number (PIN) is required for use of the credit or gift card. Registration is not required or even known by the third-party payment service associated with the card. Subsequently, when a consumer attempts to use the card and before payment instructions are sent to the corresponding third-party payment service, the secure identifier or PIN is requested and verified. If properly verified, the payment instructions are forwarded for processing by the third-party payment service.

3 Claims, 3 Drawing Sheets

TECHNIQUES FOR SECURE MOBILE PAYMENT

BACKGROUND

Automation for goods and services has reached record levels in society. Examples are everywhere from online banking and purchasing to a wide-range of devices and physical appliances that include computing and networking capabilities, which were just wishful dreams only a decade ago. Moreover, businesses and kiosks are increasingly accepting credit, debit, and gift cards as a form of payment. In fact, even alternative payment solutions are now commonplace, such as PayPal™ and others. Customers can even pay vendors via an email.

As a result, cash is being carried and used by customers less and less. This is convenient for the consumer and for the businesses because consumers are more likely to spend with alternative forms of cash than with cash. However, this convenience is not without issues.

Specifically, credit and gift card fraud is rampant, and businesses are continually looking for procedures or mechanisms to limit their exposure to fraud.

Furthermore, most third-party gift cards or credit cards do not require any information other than an account number to make a purchase. When used at a Point-Of-Sale (POS) terminal operated by a cashier this situation does not present any problem, since customer must physically present the card being used to the cashier and in some instances the cashier may additionally request a form of identification to ensure that the card being used matches the customer presenting the card. However, when a card is used at a self-service terminal (SST) or even over the Internet, a customer does not have to necessarily be in possession of the payment card. Thus, some nefarious individuals can guess at card numbers based on suspected patterns or based on previous visual inspection of a valid card (such as by waiters in restaurants that physically take cards for payment). There is no validation at these SST's or via Internet payment, which means that the likelihood for fraud increases in these situations.

SUMMARY

In various embodiments, techniques for secure mobile payment are presented. According to an embodiment, a method for secure mobile payment is provided.

Specifically, payment card information is acquired and a determination is made that an added security check associated with the payment card information is to be processed. Next, the added security check is processed and the payment card information is forwarded when the added security check is successful for payment of a transaction.

In another case, a consumer can swipe a card at a POS terminal and be asked whether security information is desired and if so, the consumer can provide the security information. The security information is mapped to details associated with the payment card being used by the consumer and a token is returned to the consumer. Now, the consumer can use that token to perform a transaction with the payment card providing the consumer properly supplies the registered security information with the token. It is noted that the security information is something that is not known and not supported by the payment service associated with the payment card. It is also noted that the token does not have to be used in all cases; that is, the payment card can be used as it typically would with the added security information.

Additionally, the token itself can be supplied in an automated fashion via a mobile device of the consumer, such as a mobile phone. Alternatively, the token can be entered via a keypad or touchscreen or even via a barcode scan from a mobile device of printed media in possession of the consumer.

DETAILED DESCRIPTION

Figure 1:
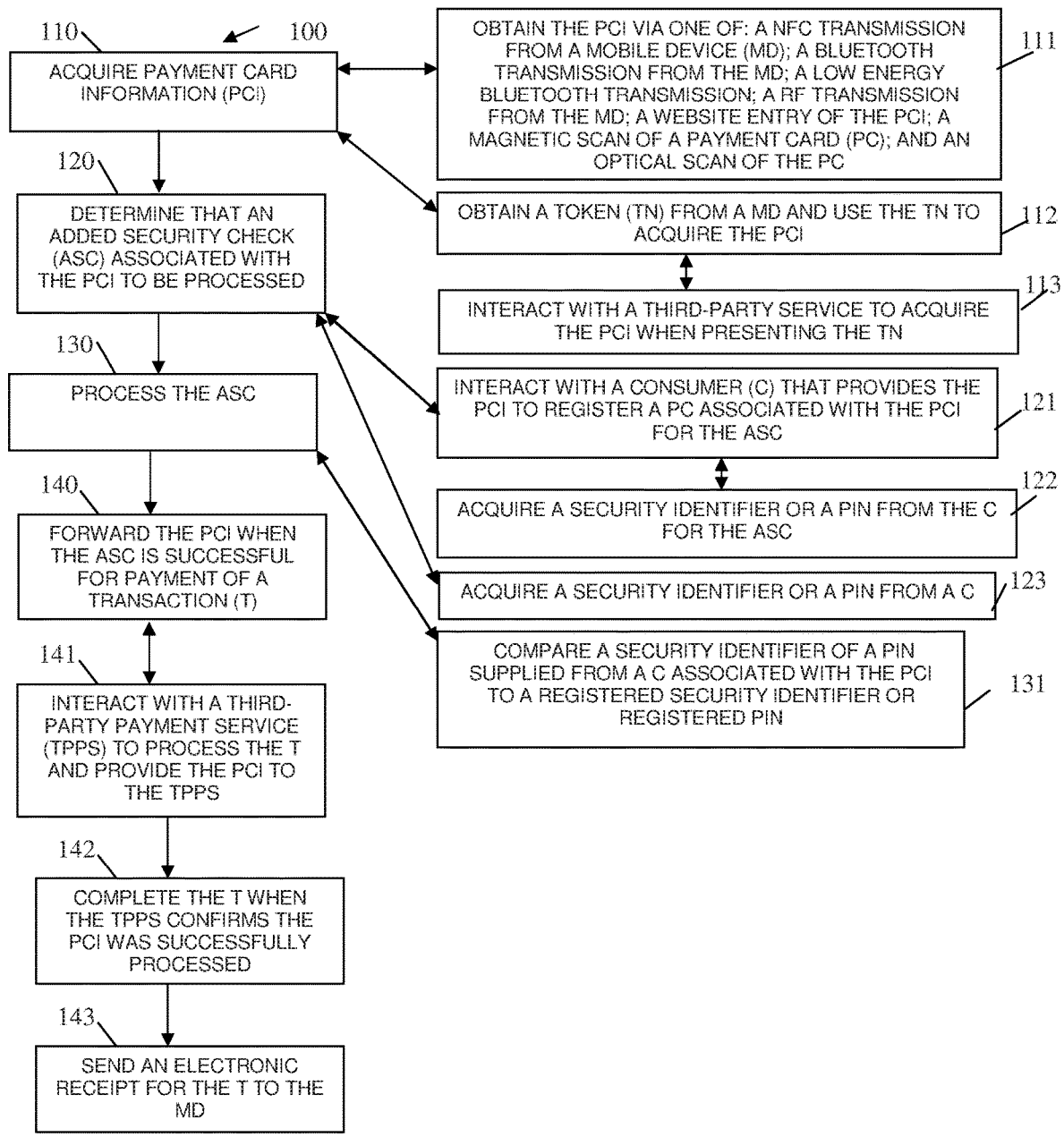
FIG. 1 is a diagram of a method for secure mobile payment, according to an example embodiment.

FIG. 1 is a diagram of a method 100 for secure mobile payment, according to an example embodiment. The method 100 (hereinafter "mobile payment manager") is implemented as instructions programmed and residing within memory and/or a non-transitory computer-readable (processor-readable) storage medium and executed by one or more processors. The processors are specifically configured and programmed to process the mobile payment manager. The mobile payment manager operates over a network. The network is wired, wireless, or a combination of wired and wireless.

In an embodiment, the mobile payment manager processes on processors of a server of cloud processing environment. In some instances, the mobile payment manager processes on a Point-Of-Sale (POS) terminal of a retailer (such as a restaurant). The POS terminal can be, in some embodiments, a thin client that interacts with a remote server having the mobile payment manager. Moreover, the mobile payment manager can process on a Virtual Machine (VM) where the underlying physical processing environment and physical processors can vary depending upon the installation of the VM. In still other cases, the mobile payment manager operates on a client-based POS terminal.

In an embodiment, the mobile payment manager acts as a front-end interface or proxy to a third-party payment service, such as credit card or gift card services. That is, the mobile payment manager intercepts payments at a POS terminal or when first transmitted from a POS terminal to perform the beneficial processing described herein and below.

At 110, the mobile payment manager acquires payment card information for payment of a transaction being conducted with a consumer. Acquisition of the payment card information can occur in a variety of automated or semi-automated manners.

It is noted that the mobile payment manager can acquire the payment card information as a token or as a card swipe. Furthermore, the payment card information can be acquired directly from a consumer via a keypad at a SST or POS terminal or when the payment card information is token via a mobile device of the consumer.

For example, at 111, the mobile payment manager obtains the payment card information via one of: a Near Field Communication (NFC) transmission from a mobile device; a Bluetooth transmission from the mobile device; a Low Energy Bluetooth transmission from the mobile device; a Radio Frequency (RF) transmission from the MD; a website entry of the payment card information, a magnetic scan of a payment card, and an optical scan of the payment card.

In another case, at 112, the mobile payment manager obtains a token from a mobile device and then uses that token to acquire the payment card information. In this manner, the payment card information is never actually stored on the mobile device of the consumer, which provides added security to the consumer in situations when the mobile device is compromised.

Continuing with the embodiment of 112 and at 113, the mobile payment manager interacts with a third-party service (such as the third-party payment service discussed below or other services) to acquire the payment card information when the token is presented. In other words, the token permits a third-party service to deliver the payment card information on demand for any given transaction.

At 120, the mobile payment manager determines that an added security check associated with the payment card information is to be processed. So, a policy tied to the consumer, a particular payment card, and/or a particular store for which the transaction is being processed, where the policy indicates that before the payment card information can be processed additional security, via the added security check, needs to be performed. It is noted that any third-party payment service that actually uses the payment card information to process and pay a transaction on behalf of consumer does not have to be aware and may not support the added security check. Thus, security is added without impacting or modifying automated third-party payment services (credit card, gift card, bank, PayPal™ and other payment services).

In an embodiment, at 121, the mobile payment manager interacts with a consumer that provides the payment card information to register a payment card associated with the payment card information for the added security check. This can be automated and appear on a mobile device screen of the consumer (such as smartphone) or can appear on a self-service terminal screen or a cashier-manned screen where the consumer is asked to register.

Continuing with the embodiment of 121 and at 122, the mobile payment manager acquires a security identifier of a Personal Identification Number (PIN) from the consumer for registering the payment card. It is noted that as used herein a PIN can include any security information, and does not have to be limited to a specific number. So, a PIN can include a doodle, a password, a phrase, etc.

In the case of 121 and 122, the mobile payment manager can, in some instances, interact in an automated fashion or a semi-automated fashion (via a cashier) to register a payment card and security information, such as a PIN. The security information can be stored and associated with the payment card and/or the consumer and then used to identify when additional security is needed for use with a payment card, such as a gift card, which traditionally does not include any additional security procedures. In some situations, such as is described below with respect to the FIG. 2 and the method 200, a security token can be provided back to the consumer (via the mobile device of the consumer), such that future storage or use of a payment card is not required because the token provides an indication as to the specific payment card and as to the added security procedure.

In another case, at 123, the mobile payment manager acquires a security identifier or a PIN from the consumer. This is the case where registration has already occurred and the added security check is being enforced with the transaction.

At 130, the mobile payment manager processes the added security check.

For example, at 131, the mobile payment manager compares a consumer or mobile-device supplied security identifier or PIN and associated with the payment card information to a registered security identifier or registered PIN to enforce the added security check.

At 140, the mobile payment manager forwards the payment card information when the added security check is successful for payment of a transaction (transaction occurring with the consumer or in an automated manner via a mobile device of the consumer).

According to an embodiment, at 141, the mobile payment manager interacts with a third-party payment service to process the transaction and provide the payment card information to the third-party payment service. Here, a vendor associated with the mobile payment manager is receiving payment for the transaction via the third-party payment service and again the third-party payment service is totally unaware of and may not even support the added security check that was registered and processed and validated as described above.

Continuing with the embodiment of 141 and at 142, the mobile payment manager completes the transaction when the third-party payment service confirms that the payment card information was successfully processed.

Still continuing with the embodiment of 142 and at 143, the mobile payment manager sends an electronic receipt for the transaction to a mobile device of the consumer. The manner of sending (text, email, etc.) can be defined based on a profile registered to the consumer.

Figure 2:
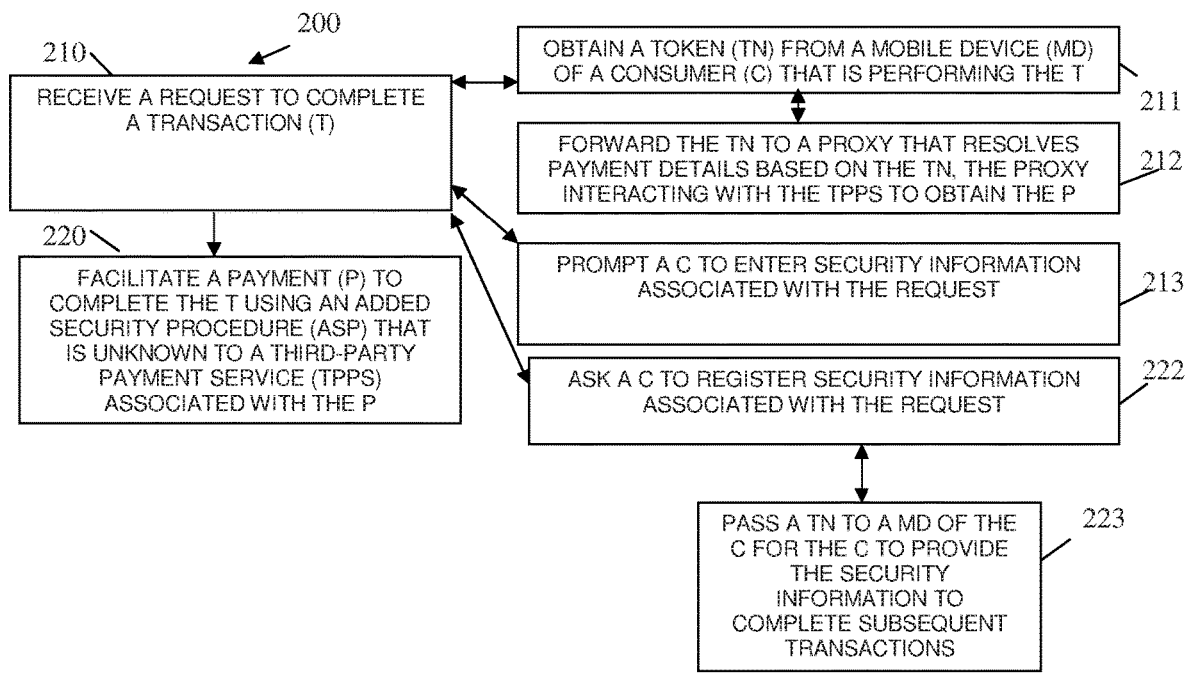
FIG. 2 is a diagram of another method for secure mobile payment, according to an example embodiment.

FIG. 2 is a diagram of another method 200 for secure mobile payment, according to an example embodiment. The method 200 (hereinafter "POS payment coordinator") is implemented as instruction and programmed within memory and/or a non-transitory computer-readable (processor-readable) storage medium that executes on one or more processors of a POS terminal; the processors of the POS terminal are specifically configured to execute the POS payment coordinator. The POS payment coordinator is operational over a network; the network is wired, wireless, or a combination of wired and wireless.

Whereas the mobile payment manager (the FIG. 1 above) describes processing (for the most part) associated with card transaction processing from the perspective of a server or remote processor, the POS payment coordinator describes processing from a POS terminal that can be cashier manned or can be a SST (unmanned by any cashier). The POS payment coordinator interacts from the POS terminal with the server or remote processer having the mobile payment manager, described in detail above with respect to the FIG. 1.

At 210, the POS payment coordinator receives a request to complete a transaction. The request can represent payment card details or a token that is used to acquire payment card details.

For example, at 211, the POS payment coordinator obtains a token in a dynamic and automated fashion from a mobile device of a consumer that is performing the transaction with the POS payment coordinator via the POS terminal that processes the POS payment coordinator.

Continuing with the embodiment of 211 and at 212, the POS payment coordinator forwards the token to a proxy that resolves the payment details based on the token. The proxy interacts with a third-party payment service to obtain payment for the transaction. An example proxy was discussed above with reference to the method 100 of the FIG. 1.

In another case, at 213, the POS payment coordinator prompts a consumer to enter security information or a PIN associated with the request. Here, the security information of the PIN was previously registered with the POS payment coordinator or with the proxy discussed above with the processing at 212 and the method 100 of the FIG. 1.

In yet another situation, at 214, the POS payment coordinator asks a consumer to register security information or a PIN with the request (type of payment being made). Here, a new payment method is being used that the POS payment coordinator identifies as not having added security and can ask the consumer to register the new payment method (identified in the request) and associate the security information or a PIN.

Continuing with the embodiment of 215 and at 215, the POS payment coordinator passes a token to a mobile device of the consumer for the consumer to provide with the security information to complete subsequent transactions. Here, the payment card or payment method associated with the request does not have to be provided a second time and can be deleted from the consumer's mobile device once the mobile device has the token.

It is noted that custom mobile apps to facilitate the automated processing described herein can be provided via app stores to the consumers for download and execution on the consumer's mobile device (smartphone, tablet, PC, wearable device, etc.).

It is also noted that the token can be used in place of a payment card entirely, such that it is just the token supplied. The token itself can be printed for the consumer, in some instances, on any receipt provided to the consumer. So, the card can be completely dispensed with once registered and a token (which can be automated via the mobile device of the consumer) can be used to effectuate payment and to provide a receipt to the consumer.

At 220, the POS payment coordinator facilitates a payment to complete the transaction by using an added security procedure that is unknown to a third-party payment service associated with the payment. This added security procedure was described above with reference to the POS payment coordinator and also described in even greater detail above with respect to the method 100 of the FIG. 1. Again, the third-party payment service (service that processes the payment type) is completely unaware of and does not support the added security procedure. Moreover, the added security procedure can be custom added by the consumer or based on policy and the policy can be tied to the amount of the transaction, the type of transaction, an identity of the consumer, the mobile device of the consumer, the vendor associated with the POS payment coordinator, or all or various combinations of these things.

Figure 3:
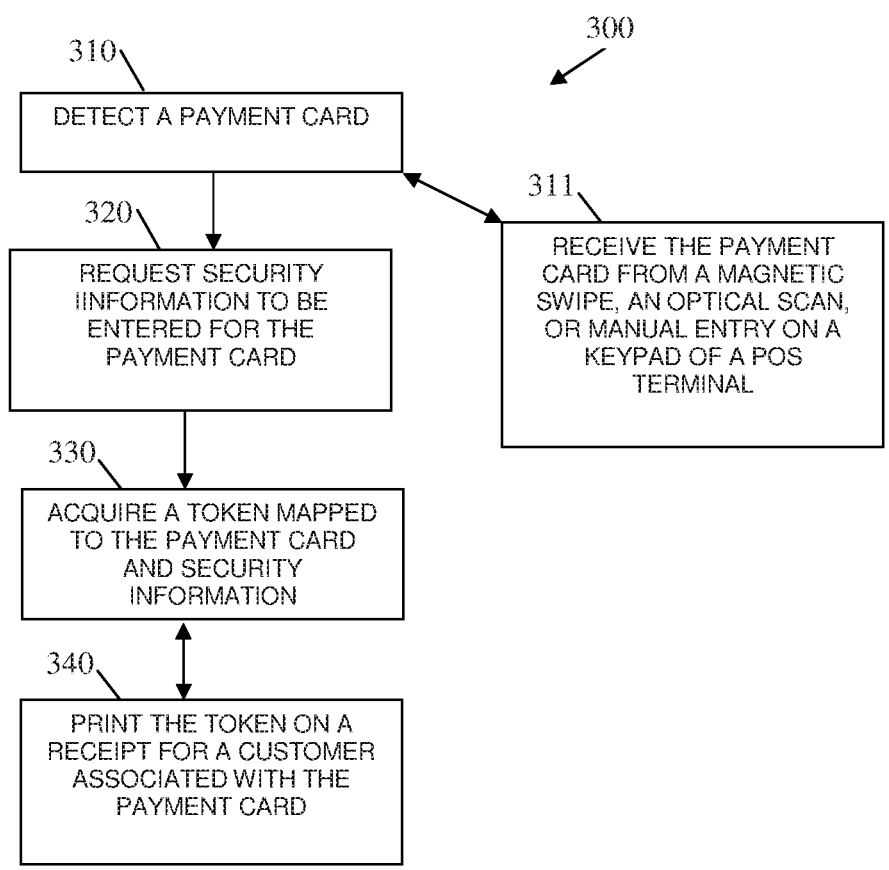
FIG. 3 is a diagram of a method for secure mobile payment registration, according to an example embodiment.

FIG. 3 is a diagram of another method 300 for secure mobile payment registration, according to an example embodiment. The method 300 (hereinafter "registration service") is implemented as instruction and programmed within memory and/or a non-transitory computer-readable (processor-readable) storage medium that executes on one or more processors of a POS terminal or server; the processors of the POS terminal or server are specifically configured to execute the registration service. The registration service is operational over a network; the network is wired, wireless, or a combination of wired and wireless.

At 310, the registration service detects a payment card. This can be presented in a number of ways.

For example, at 311, the registration service detects the payment card or details associated with the payment card via a magnetic swipe, an optical scan, or even manual entry of the payment card details via a keypad (can be touch screen) associated with a POS terminal.

At 320, the registration service requests that a consumer or customer associated with the payment card enter security information, such as a PIN (the PIN can be non numeric such as a password or phrase as discussed above).

At 330, the registration service acquires a token mapped to the payment card and the security information. It may be that the registration service stores the mapping or enlists the services of a third-party to store the mapping. The mapping permits a security token to be linked directly to the details of the payment card and the security information entered by the consumer/customer. This is particularly advantageous for traditional gift cards that have little to no security although any type of payment mechanism can be registered.

According to an embodiment, at 340, the registration service prints the token on a receipt for the customer. This token can then be used for subsequent purchases associated with the payment card without having to provide the actual payment card as long as the token and the proper security information is provided at the time of the subsequent purchases. It is also noted that the token may be automatically sent to a mobile device via a text, application message, or even email of the customer. So, the customer can enter the token into an application or the customer can automatically receive the token in the application. Moreover, it may be there is no application at all, such that the customer simply enters the token at a POS terminal to complete a transaction. In some cases, the token is a bar code that the customer can use his/her mobile device to scan into an application on the mobile device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in memory or a non-transitory processor-readable medium and to execute on one or more processors of a device configured to execute the method, comprising:

detecting, by the one or more processors of the device, a payment card presented for a transaction at a terminal;

registering, by the one or more processors of the device, the payment card with a consumer associated with the transaction;

registering, by the one or more processors of the device, a security policy defined by the consumer;

providing, by the one or more processors of the device, a token to a mobile device operated by the consumer, wherein the token maps the consumer, payment card details from the payment card, and the security policy to the token;

providing, by the one or more processors of the device, the token, the security policy, and the payment card details to a third-party service to maintain as a mapping on behalf of the consumer;

processing, by the one or more processors, the transaction using the payment card details of the payment card;

receiving, by the one or more processors of the device, the token provided by the mobile device during a subsequent transaction with the consumer at the terminal;

requesting, by the one or more processors of the device, security information associated with the security policy to be entered for the token; and providing, by the one or more processors of the device, the token and the security information to the third-party service along with transaction details for the subsequent transaction for completing payment of the subsequent transaction on behalf of the consumer using the mapping associated with the token and the security information entered and without the terminal sending the payment card details associated with the payment card to a payment service for the subsequent transaction.

2. The method of claim 1 further comprising, printing the token on a receipt for a customer during the transaction.

3. The method of claim 1, wherein detecting further includes receiving the payment card from a magnetic swipe, an optical scan, or manual entry on a keypad of the terminal.

\* \* \* \* \*